UNITED STATES PATENT OFFICE 2,472,453

STREPTOMYCIN COMPOSITION OF REDUCED TOXICITY

Frank J. Wolf, Westfield, and Max Tishler, Rahway, N. J., assignors to Merck & Co., Inc., Rahway, N. J., a corporation of New Jersey No Drawing. Application July 26, 1946,
Serial No. 686,460

1 Claim. (Cl. 167—65)

This invention relates to therapeutic compositions having reduced toxicity, and more particularly to therapeutic agents comprising streptomycin in association with material lowering the toxicity thereof.

Streptomycin is a new drug produced as an elaboration product in the cultivation of strains of the micro-organism *Streptomyces griseus* under controlled conditions. It has been found to be highly effective in the treatment of diseases and infections including some which do not respond to penicillin or other available drugs. Like penicillin, the effectiveness of streptomycin often depends on administering a large amount of the drug in a single dose or within a short period of time; and it has been found that optimal doses required might be hazardous due to the toxicity caused by readily available preparations.

It may be possible by extensive purification to reduce the toxicity to the point where all optimal doses can be tolerated but to do this by known methods involves costly procedures and material losses of the drug. For these reasons streptomycin preparations of low toxicity are not readily available at the present time.

It has been discovered in accordance with the present invention that toxicity of available streptomycin preparations can be reduced sufficiently to permit 50% to in excess of 100% larger doses in the case of intravenous injection without added toxic reactions by the addition of a salt of calcium such as calcium chloride. This advantageous result is achieved not only with partially purified streptomycin, but also with the purest streptomycin obtainable by known procedures. The reduction of toxicity is even more pronounced in the case of subcutaneous injection, and doses administered by this route can be increased by 200 to 300%. In thus reducing the toxicity of streptomycin preparations, the therapeutic properties remain unimpaired so that the therapeutic value of streptomycin in the new preparations is enhanced substantially in proportion to the increased doses which can be tolerated.

The new therapeutic agents of the present invention can be prepared in different ways. According to one procedure, the calcium salt is added to an aqueous solution of partially purified streptomycin as, for example, an aqueous solution of streptomycin hydrochloride, and the resulting solution is concentrated to dryness, preferably by freezing and drying from the frozen state under reduced pressure, yielding an amorphous powder. The streptomycin solution should preferably be of such a degree of purity that the streptomycin contained therein has, on a dry basis, a potency of about 400 units/mgm. or higher. It will be understood in this connection that with lower potency material, the toxicity is similarly decreased by addition of a calcium salt.

The use of streptomycin having a potency lower than about 400 units/mgm. is not recommended, however, because of the large amounts of such low potency material that must be used for effective doses.

The amount of calcium salt added to the streptomycin depends in part upon the potency of the starting streptomycin preparation, and is generally somewhat larger in the case of higher potency preparations. Different batches of streptomycin, however, vary considerably in degree of toxicity and this batch-to-batch difference is also a factor to consider in determining the amount of calcium salt to be added.

It has been found that optimal conditions of reduced toxicity are obtained when the starting streptomycin is combined with 8 to 16% of its weight (dry basis) of calcium chloride. This is illustrated in the following table showing results obtained in tests for intravenous toxicity in mice using 0.5 cc. per 5 seconds and 5 mice per level. (The standard error of each L. D. 50 is approximately 10% of the L. D.) In preparing the injection solution, the dried streptomycin and streptomycin plus calcium chloride preparations were dissolved in water to a concentration of about 3000 to 8000 γ (or units) per cc.

Table I

| | Lot | | |
|---|---|---|---|
| | A | B | C |
| Potency, γ/mgm | 425 | 564 | 625 |
| L. D. 50 in γ/20 gm. (mouse): | | | |
| 1. Streptomycin alone | 1,600 | 1,350 | 2,250 |
| 2. Streptomycin plus 8% CaCl₂ | 3,450 | 1,830 | 3,240 |
| 3. Streptomycin plus 16% CaCl₂ | 2,750 | 2,680 | 3,460 |
| 4. Streptomycin plus 24% CaCl₂ | | 2,500 | 3,400 |
| 5. Streptomycin plus 32% CaCl₂ | | 2,500 | 2,300 |
| Mgm. CaCl₂ per 1000γ streptomycin at 8% level | 0.19 | 0.14 | 0.13 |

NOTE.—The L. D. 50 of CaCl₂ alone was 2.50 mgm./20 gm.

From Table I it is apparent that the addition of 8% CaCl₂ reduced the intravenous toxicity to 74 to 46% of the toxicity of the untreated drug.

Lot A in Table I was also tested for subcutaneous toxicity with the following results:

Table II

| Material tested | L. D. 50 in γ/20 gm. (mouse) |
|---|---|
| Streptomycin alone | 9,500 |
| Streptomycin plus 8% CaCl₂ | Over 25,000 |

The marked advantages of reduced toxicity in streptomycin for intravenous and subcutaneous injection can also be attained by dissolving a streptomycin preparation of the type presently available in a sterile solution of calcium chloride, when making up the solution for injection. In making up such an injection solution, a stock solution of calcium chloride is preferably employed and the streptomycin is dissolved in sufficient of the stock solution to provide an amount of calcium chloride equivalent to about 8 to 16% of the streptomycin (on a dry basis). The resulting solution is then diluted with sterile water, if necessary, to adjust the concentration of streptomycin to the desired $\gamma$/cc. for injection purposes. By this procedure the reaction or coaction between the streptomycin and calcium chloride is equally as effective in reducing the toxicity as is the case when the calcium chloride-streptomycin product is dried and then redissolved in making an injection solution.

A number of other calcium salts can be employed as well as calcium chloride to reduce streptomycin toxicity in accordance with the present invention. These include in general all organic and inorganic salts of calcium which are substantially non-toxic (i. e., calcium salts which, by themselves, and in the amounts corresponding to the maximum doses of the new sterptomycin preparations, produce no objectional reactions in the body).

The effectiveness of calcium salts in reducing the toxicity of streptomycin preparations appears to be due to the calcium and not to the particular anion with which it is associated. Thus, while 8 to 16% of calcium chloride in a streptomycin preparation gives the optimum of reduced toxicity, it will be apparent that calcium salts of higher molecular weight must be used in somewhat greater amounts to supply the most favorable amount of calcium. In Table III the results of tests made with streptomycin preparations containing different calcium salts in different amounts are tabulated. The reduction in toxicity is indicated by the increase of the L. D. 50 (expressed in $\gamma$/20 gm. mouse).

*Table III*

| Calcium Salt | Mg. Ca salt/100 mg. anhydrous streptomycin hydrochloride | | | |
|---|---|---|---|---|
| | 8 | | 12 | |
| | L. D. 50 | Ca$^{++}$ conc.[1] | L. D. 50 | Ca$^{++}$ conc.[1] |
| none | 2000 | | 2600 | |
| chloride | 3400 | 1.0 | 3400 | 1.5 |
| bromide | 2400 | 0.44 | 2870 | 0.67 |
| acetate | 2200 | 0.53 | 3100 | 0.81 |
| lactate | 2300 | 0.37 | 2200 | 0.55 |
| gluconate | 2090 | 0.21 | 2870 | 0.31 |
| nitrate | 2870 | 0.54 | | 0.83 |

[1] Ca$^{++}$ concentration relative to CaCl$_2$ at 8 mg./100 = 1.

Streptomycin preparations of reduced toxicity can be made up using suitable calcium salts other than calcium chloride by following either of the procedures described for making up the streptomycin-calcium chloride preparations.

Modifications may be made in carrying out the present invention without departing from the spirit and scope thereof, and we are to be limited only by the appended claim.

We claim:

A streptomycin preparation of reduced toxicity comprising, as an amorphous powder, an unreacted mixture of streptomycin with 8 to 16% of its weight of calcium chloride.

FRANK J. WOLF.
MAX TISHLER.

REFERENCES CITED

The following references are of record in the file of this patent:

J. A. C. S., Oct., 1945, pages, 1866 to 1867.